United States Patent
Mantese et al.

(10) Patent No.: US 11,428,577 B2
(45) Date of Patent: Aug. 30, 2022

(54) PYROELECTRIC PRESENCE IDENTIFICATION SYSTEM

(71) Applicant: CARRIER CORPORATION, Palm Beach Gardens, FL (US)

(72) Inventors: Joseph V. Mantese, Ellington, CT (US); Alan Matthew Finn, Hebron, CT (US); Nicholas Charles Soldner, Southbury, CT (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 1049 days.

(21) Appl. No.: 15/999,528

(22) PCT Filed: Feb. 8, 2017

(86) PCT No.: PCT/US2017/016948
§ 371 (c)(1),
(2) Date: Aug. 17, 2018

(87) PCT Pub. No.: WO2017/142757
PCT Pub. Date: Aug. 24, 2017

(65) Prior Publication Data
US 2021/0208004 A1 Jul. 8, 2021

Related U.S. Application Data
(60) Provisional application No. 62/296,352, filed on Feb. 17, 2016.

(51) Int. Cl.
*G01J 5/34* (2022.01)
*G01J 5/00* (2022.01)
(Continued)

(52) U.S. Cl.
CPC .............. *G01J 5/34* (2013.01); *G01J 5/0025* (2013.01); *G01J 5/0805* (2022.01); *G06V 20/00* (2022.01);
(Continued)

(58) Field of Classification Search
None
See application file for complete search history.

(56) References Cited

U.S. PATENT DOCUMENTS 5,486,698 A * 1/1996 Hanson .................... H04N 5/33
250/350
5,512,748 A * 4/1996 Hanson .................... G01J 5/34
250/331
(Continued)

FOREIGN PATENT DOCUMENTS

AU 2012283079 B2 * 2/2016 ............. G07C 11/00
CN 105874269 A * 8/2016 ........... G08B 13/194
(Continued)

OTHER PUBLICATIONS

ISR/WO, Issued May 12, 2017, 12 pages.

*Primary Examiner* — Reza Aghevli
(74) *Attorney, Agent, or Firm* — Cantor Colburn LLP (57) ABSTRACT

A pyroelectric presence identification system includes focal plane array and a processor coupled to the focal plane array. The focal plane array includes a first image sensor and a plurality of second image sensors configured to convert radiant energy into an electrical signal. The processor is configured to control the focal plane array in a sleep mode wherein the first image sensor is utilized to detect gross motion of at least one presence and the plurality of second image sensors are de-energized.

18 Claims, 4 Drawing Sheets

(51) Int. Cl.
*H04N 5/33* (2006.01)
*G01J 5/08* (2022.01)
*G06V 20/00* (2022.01)
*G01J 5/0805* (2022.01)

(52) U.S. Cl.
CPC ........ *H04N 5/33* (2013.01); *G01J 2005/0077* (2013.01); *G01J 2005/345* (2013.01)

(56) References Cited

U.S. PATENT DOCUMENTS

| | | | | |
|---|---|---|---|---|
| 5,602,043 | A * | 2/1997 | Beratan | G01J 5/34 257/E27.137 |
| 5,644,838 | A * | 7/1997 | Beratan | H01L 37/02 430/329 |
| 5,952,661 | A * | 9/1999 | Klocek | H04N 5/33 250/350 |
| 5,972,108 | A * | 10/1999 | Beratan | H01L 37/02 117/94 |
| 5,990,481 | A * | 11/1999 | Beratan | G01J 5/34 250/338.3 |
| 6,020,216 | A * | 2/2000 | Beratan | H01L 27/1465 257/E27.137 |
| 6,034,371 | A * | 3/2000 | Kormos | G01J 5/0805 250/233 |
| 6,040,577 | A * | 3/2000 | Mauduit | H04N 5/33 250/338.3 |
| 6,137,107 | A * | 10/2000 | Hanson | G01J 5/0805 250/338.2 |
| 6,539,137 | B1 * | 3/2003 | Moresco | G01J 5/34 250/338.3 |
| 9,635,285 | B2 * | 4/2017 | Teich | H04N 5/33 |
| 9,664,562 | B1 * | 5/2017 | Goodnough | H04N 5/23287 |
| 2004/0212678 | A1 * | 10/2004 | Cooper | G08B 13/19602 348/143 |
| 2005/0061977 | A1 * | 3/2005 | Carr | G01J 5/061 250/372 |
| 2006/0181627 | A1 * | 8/2006 | Farrier | H01L 27/14634 348/E3.018 |
| 2013/0206990 | A1 * | 8/2013 | Hsu | G01J 5/12 250/353 |
| 2014/0042319 | A1 * | 2/2014 | Pickett | H04N 5/33 250/330 |
| 2014/0132774 | A1 * | 5/2014 | Schmidt | H04N 5/367 29/469 |
| 2015/0069245 | A1 * | 3/2015 | Nagahisa | G01V 8/10 250/340 |
| 2015/0136981 | A1 * | 5/2015 | Kester | G01J 3/0229 250/330 |
| 2016/0202678 | A1 * | 7/2016 | Aggarwal | H04N 5/33 700/275 |
| 2016/0209273 | A1 * | 7/2016 | Kubo | H01L 41/0805 |
| 2017/0124713 | A1 * | 5/2017 | Jurgenson | G06V 20/00 |
| 2017/0147885 | A1 * | 5/2017 | Aggarwal | G06T 7/248 |
| 2017/0150069 | A1 * | 5/2017 | Parrish | H04N 7/181 |
| 2019/0017875 | A1 * | 1/2019 | Finn | G01J 5/0806 |
| 2019/0033139 | A1 * | 1/2019 | Mantese | G01J 5/0025 |
| 2019/0033901 | A1 * | 1/2019 | Mantese | G05D 23/1932 |
| 2019/0043324 | A1 * | 2/2019 | Dardona | G08B 13/193 |
| 2019/0049570 | A1 * | 2/2019 | Xiong | G08B 25/14 |

FOREIGN PATENT DOCUMENTS

| | | | | |
|---|---|---|---|---|
| EP | 2871452 | A1 * | 5/2015 | ............ G01J 3/0208 |
| FR | 3005367 | A1 * | 11/2014 | ............ H04N 5/374 |
| FR | 3005367 | A1 | 11/2014 | |
| KR | 20140082726 | A * | 7/2014 | ............ G01J 5/0025 |
| WO | WO-2015084267 | A1 * | 6/2015 | ............ G01J 5/046 |

* cited by examiner

PYROELECTRIC PRESENCE IDENTIFICATION SYSTEM

CROSS-REFERENCE TO RELATED APPLICATIONS

This application claims the benefit of PCT/US2017/016948 filed Feb. 8, 2017, which claims priority to U.S. Provisional Application No. 62/296,352 filed Feb. 17, 2016, which is incorporated herein by reference in its entirety.

BACKGROUND

The present disclosure relates to a presence identification system, and more particularly, to a presence identification system having a pyroelectric focal plane array.

Pyroelectric detectors are typically limited to pixel counts of about 4×4 elements to stay reasonable in terms of cost and performance. Even with advances in MEMS, the pixel counts often remain less than approximately 100×100. The manufacturing process for these detectors does not scale well in terms of cost as pixel count increases. Additionally, the physical size of a pyroelectric focal plane array is large compared to the same pixel count for, as one example, complementary metal oxide silicon (CMOS) visible sensors because of the larger wavelength. The large physical size may lead to higher costs due to decreased yields. Moreover, cameras and other imaging devices that use CMOS based focal plane arrays detect reflected light rather than radiated light, and hence see a great deal of background clutter that can confuse visible-spectrum-based decision making algorithms. As such, 1×1 to 4×4 pyroelectric elements are commonly used for occupancy detectors (as one example), but they are not able to count with the fidelity needed to assist various systems such as heating, ventilation, and air conditioning (HVAC) systems, lighting systems and transportation systems. In larger sizes, such as 100×100 pixels, counting becomes possible, but the costs become prohibitive. Yet further, energy consumption of pyroelectric focal plane arrays becomes large for arrays having sufficient pixels to meet fidelity needs when supporting other systems, such as HVAC and lighting. Alternative, cost effective, methods are desirable to perform occupancy detection, counting and/or identification with improved fidelity and reduced energy consumption.

SUMMARY

A pyroelectric presence identification system according to one, non-limiting, embodiment of the present disclosure includes a focal plane array including a first image sensor and a plurality of second image sensors, with the first and second image sensors configured to convert radiant energy into an electrical signal; and a processor coupled to the focal plane array and configured to control the focal plane array in a sleep mode wherein the first image sensor is utilized to detect gross motion of at least one presence and the plurality of second image sensors are de-energized.

Additionally to the foregoing embodiment, the presence identification system is configured to operate in a chopperless-active mode wherein at least the plurality of second image sensors are energized for detection and counting of the at least one presence, and a chopping mode wherein at least the plurality of second image sensors are energized for identification of the at least one presence.

In the alternative or additionally thereto, in the foregoing embodiment, the system includes a mechanical chopper disposed between a scene and the focal plane array.

In the alternative or additionally thereto, in the foregoing embodiment, the first image sensor is configured to view a first portion of a first scene and the plurality of second image sensors are configured to view a second portion of the scene.

In the alternative or additionally thereto, in the foregoing embodiment, the first image sensor and the plurality of second image sensors are infrared sensors.

In the alternative or additionally thereto, in the foregoing embodiment, the infrared sensors are passive infrared sensors.

In the alternative or additionally thereto, in the foregoing embodiment, the system includes a battery for providing electrical power.

In the alternative or additionally thereto, in the foregoing embodiment, the system includes a substrate platform with the focal plane array and the processor integrated onto the substrate platform.

In the alternative or additionally thereto, in the foregoing embodiment, the system includes a wireless network configured to communicate with the processor to alter modes of operation.

In the alternative or additionally thereto, in the foregoing embodiment, the system includes a battery for providing electrical power to at least the focal plane array.

In the alternative or additionally thereto, in the foregoing embodiment, the first image sensor is configured to view a first scene and the plurality of second image sensors are configured to view a second scene.

In the alternative or additionally thereto, in the foregoing embodiment, the first image sensor and the plurality of second image sensors are infrared sensors.

In the alternative or additionally thereto, in the foregoing embodiment, the infrared sensors are passive infrared sensors.

In the alternative or additionally thereto, in the foregoing embodiment, the system includes a battery for providing electrical power.

In the alternative or additionally thereto, in the foregoing embodiment, the system includes a substrate platform with the focal plane array and the processor integrated onto the substrate platform.

A method of operating a pyroelectric presence identification system according to another, non-limiting, embodiment includes monitoring a scene for gross motion by a focal plane array of a detection device operating in a sleep mode; sensing the gross motion by the detection device; detecting at least one presence by the detection device operating in a chopperless-active mode; and identifying the at least one presence by the detection device operating in a chopping mode.

Additionally to the foregoing embodiment, the detection device when operating in the chopping mode is configured to identify the at least one presence.

In the alternative or additionally thereto, in the foregoing embodiment, at least one first image sensor of the focal plane array is utilized and a plurality of second image sensors of the focal plane array are de-energized when operating in the sleep mode.

In the alternative or additionally thereto, in the foregoing embodiment, the plurality of second image sensors are energized when operating in the chopperless-active mode.

In the alternative or additionally thereto, in the foregoing embodiment, the plurality of second image sensors are energized when operating in the chopping mode.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
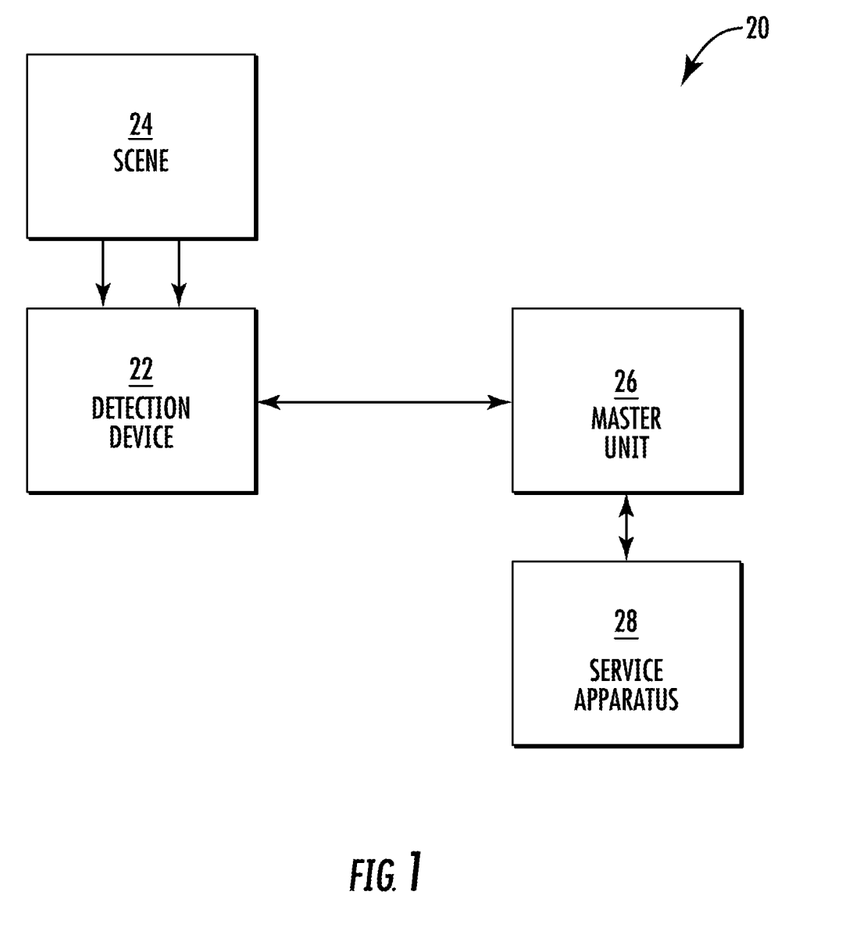
FIG. 1 is a schematic of a pyroelectric presence detection system as one, non-limiting, exemplary embodiment of the present disclosure.

Referring to FIG. 1, an exemplary embodiment of a pyroelectric presence identification system 20 is illustrated. The identification system 20 may include a detection device 22 configured to monitor a scene 24, a master unit 26 configured to communicate with the detection device 22, and a service apparatus 28 configured to communicate with the master unit. Non-limiting examples of the master unit 26 may be a building management system and/or a network that may be wireless. The master unit 26 may further be configured to control various modes of operation of the detection device 22. The service apparatus 28 may be controlled, at least in-part, by the master unit 26 and via presence data that may be received and processed, at least in-part, by the master unit 26. Non-limiting examples of the service apparatus 28 may be a security system, a building lighting system, a heating, ventilation and air conditioning (HVAC) system, a transportation system (e.g., elevators and/or escalators), and others.

Figure 2:
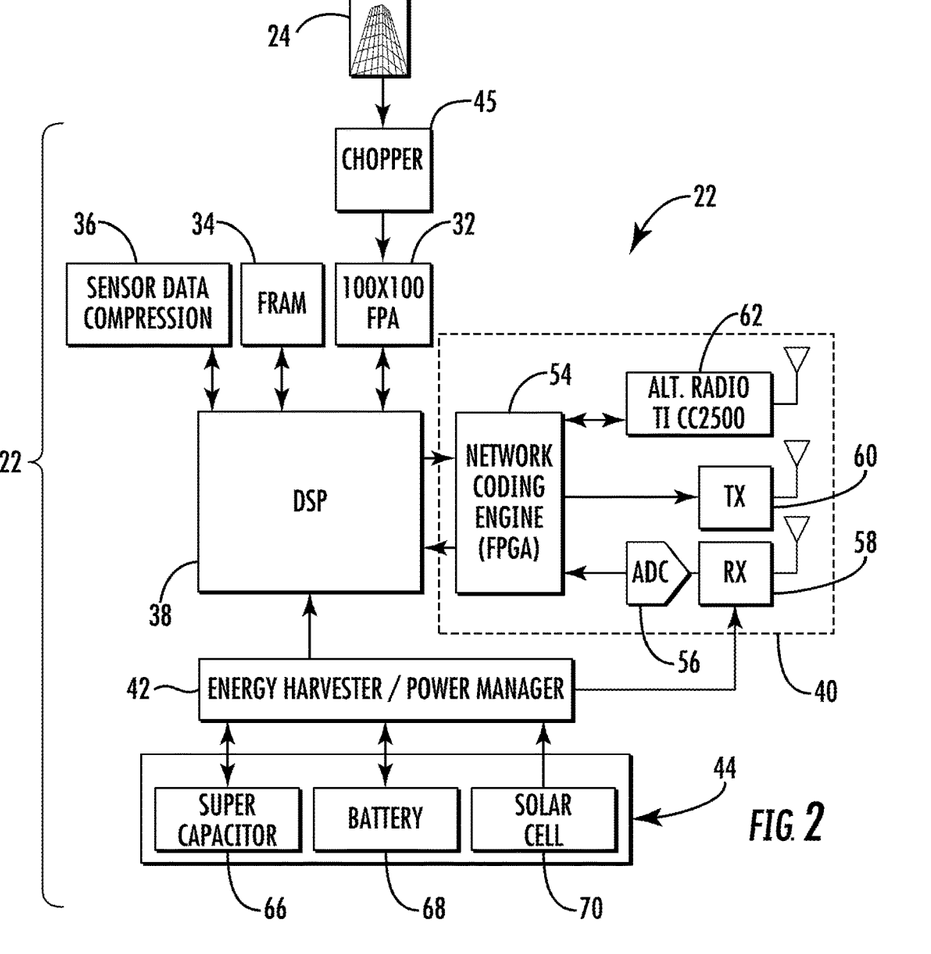
FIG. 2 is a schematic of a detection device of the pyroelectric presence detection system.
Figure 3:
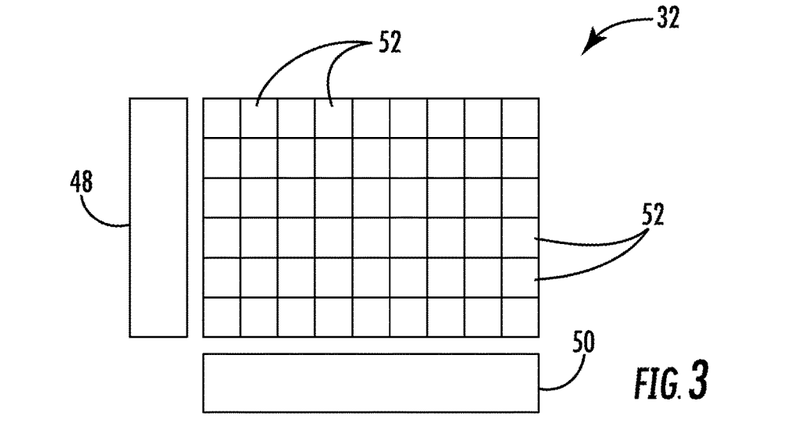
FIG. 3 is a schematic of a focal plane array of the detection device.

Referring to FIGS. 2 and 3, the detection device 22 may include a focal plane array (FPA) 32, a memory module 34, an optional sensor data compression block 36, a processor 38, a communication module 40, a power management module 42, a power source 44, and a chopper 45. The FPA 32 may be an infrared focal plane array configured to sense and detect radiated heat emitted by objects (e.g., persons) in the scene 24. The FPA 32 includes a row decoder 48, a column decoder 50, which may also be part of the Read-Out Integrated Circuit (ROIC), and a plurality of sensors 52 that may be infrared sensors arranged in a series of rows and columns (i.e., six rows and nine columns illustrated in FIG. 3). The row and column decoders 48, 50 are electrically coupled to the respective rows and columns of sensors 52, and are configured to receive intensity information (e.g., heat intensity) recorded over a pre-determined time interval. As one example, the sensors 52 may be configured to sense radiated energy having an infrared long wavelength that may be within a range of about seven (7) to fifteen (15) micrometers. This range is a thermal imaging region, in which the sensors 52 may obtain a passive image of objects (e.g., the human body) that is in whole or in part at only a slightly higher temperature than, for example, room temperature. This image may be based on thermal emissions only and requires no visible illumination.

The memory module 34 is generally a computer readable and writable storage media and is configured to communicate with the processor 38 and generally stores intensity data from the sensors 52 for later processing and stores executable programs and their associated permanent data as well as intermediate data from their computation. The memory module may be a random-access memory (RAM) that may be a ferroelectric RAM (FRAM) having relatively low power consumption with relatively fast write performance, and a high number of write-erase cycles.

The image intensity information received by the decoders 48, 50 may be conditioned via a signal conditioning circuit (not shown) that may also part of the ROIC and then sent to the processor 38. Signal conditioning may include analog-to-digital converters and other circuitry to compensate for noise that may be introduced by the sensors 52. The processor 38 may be configured to provide focal plane scaling of the intensity value data received from the signal condition circuit and may further provide interpolation techniques generally known in the art. The processor 38 is generally computer-based and examples may include a post-processor, a microprocessor and/or a digital signal processor.

The communication module 40 is configured to send and receive information and commands relative to the operation of the detection device 22. The communication module 40 may include a network coding engine block 54, an ADC 56, a receiver 58 (e.g. wireless), and a transmitter 60 (e.g., wireless). The network coding engine block 54 is configured to interface the input and output of processor 38 to transmitter 60, receiver 58 (through ADC 56), and provide encoding and decoding (i.e., for error detection and correction, security via encryption or authentication, etc.).

The ADC 56 is configured to convert analog received information to digital information for eventual use by processor 38. Network Coding Engine 54 provides any decoding necessary for error detection and correction, or security.

The receiver 58 is configured to perform wide bandwidth down-conversion of received electromagnetic signals for both communication and sensing applications. Receiver 58 may be constructed as a single IC in standard CMOS, but employing wide bandwidth materials. Receiver 58 may receive wireless communication from other systems such as a HVAC control system, a security monitoring system, a transportation system, a building management system, or others, which provide functions that depend on the presence detection provided by detection device 22.

The transmitter 60 is configured to send wireless communication to other systems such as an HVAC control system, a security monitoring system, a transportation system, a building management system, or others, which provides functions that depend on the presence detection provided by detection device 22.

The power management module 42 is configured to control the power acquisition and power consumption of detection device 22 by controlling both the power source 44 (e.g., super capacitor 66, battery, 68, and solar cell 70), and power consuming devices such as, for example, the processor 38, (including the optional data compression 36, memory 34, FPA 32), and communication module 40 (including transmitter 60, receiver 58, and ADC 56). It will be understood that other short-term energy storage devices may be used in place of super capacitor 66, long-term energy storage devices in place on battery 68, and energy harvesting or recharging devices in place of solar cell 70 including power from a power grid. Similarly other energy consuming parts of detector device 22 (not shown) may be controlled. The control consists of simultaneously maintaining detector device 22 functionality while maximizing life (i.e., the length of time detector device 22 may remain functional). In one embodiment, this control is achieved by receding horizon control (optimization). In alternative embodiments other control strategies such as model predictive control may be used.

The power management module 42 may also issue commands to the FPA 32 so as to turn off or turn on various pixel elements of the array 52 or place the ROIC of the pyroelectric FPA 32 in a quiescent low power state. These "sleep" or low power consumption modes will enable the detector device 22 to minimize power consumption when not required. The commands may be sent via processor 38 or may be sent directly to FPA 32 (not shown).

The FPA 32 may function via absolute intensity (i.e., a chopped mode) or relative intensity (i.e., a chopperless mode). In an absolute intensity mode, an additional device known as a chopper (also when mechanically instantiated called a rotating shutter), provides a reference constant-temperature image source and the difference from this reference view is the data from FPA 32 provided to Processor 38. Conversely, in a relative intensity sensor there is no chopper and only intensity differences from the previous image are provided. The key characteristic of these relative intensity images is that an object disappears if it does not move, because there is no temperature difference at a given pixel location from the previous image.

In one embodiment, chopper 45 may be interposed between the FPA 32 and the scene 24 so as to interrupt electromagnetic radiation emanating from the scene 24 from reaching the FPA 32. Chopper 45 may be any of a variety of types such as, for example, a rotating wheel with alternating transmissive areas and non-transmissive areas. The rotation of such a chopper is coordinated with the acquisition of images by the FPA 32 such that an image is acquired only when one of the transmissive areas or non-transmissive areas is fully in front of FPA 32. When a non-transmissive area blocks electromagnetic radiation, the FPA 32 receives a background amount of radiation from chopper 45. When a transmissive area passes electromagnetic radiation, FPA 32 receives radiation from scene 24. In this case, since FPA 32 is sensitive only to differences in received radiation, the entire scene 24, both stationary and moving objects, will create signals on the pixels 52. In other embodiments chopper 45 may be implemented using flexible film electrostatic MEMS actuators, on-chip temperature references, etc.

The pyroelectric array 22 may be operated without the use of an on-chip or external temperature reference as provided by a chopper 45. In this mode of operation, only motion is captured through the generation of an image derived from thermal variations due to motion. Such a mode of operation can be used to further reduce power consumption.

The power source 44 provides power to the detection device 22 and may include at least one of a super capacitor 66, a battery 68 and a solar cell 70. The power management module 42 is configured to draw power from any one of the power sources as dictated by the needs of the system. The power management module 42 may also facilitate a power scheduling function that controls the simultaneous use of the various detection device 22 component functions to minimize unwanted current spikes.

Figure 4:
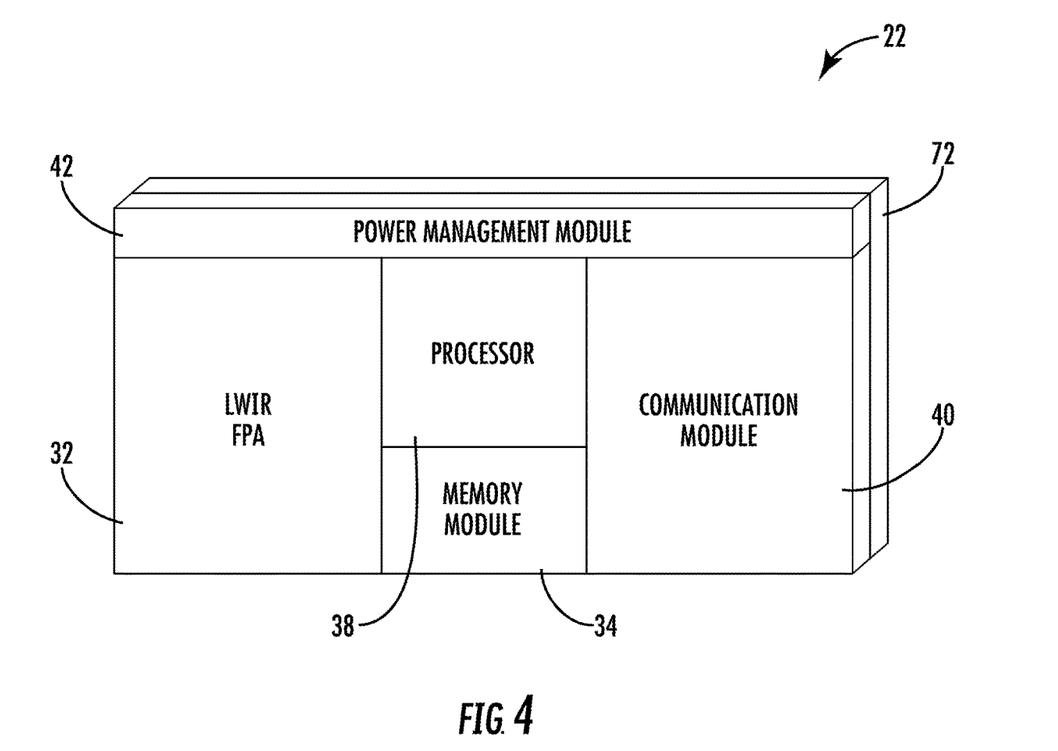
FIG. 4 is a perspective view of components of the detection device integrated into a common substrate platform.

Referring to FIG. 4, the FPA 32, the memory module 34, the processor 38, the power management module 42, and the communication module 40 may generally be integrated together on a single substrate platform or chip 72 that may be silicon-based. More specifically, the components may generally be integrated with the FPA 32. Together, the integrated components may be aimed toward minimal power consumption, small overall size/weight and low cost. Integration of these components may be further enhanced via a power scheduling function conducted by the power management module 42 as well as coordinated design of the individual functions of each component to work harmoniously. That is, the power scheduling function may, for example, minimize unwanted current spikes by controlling the simultaneous use of the various on-chip component functions.

By placing individual subsystem components on the same die or chip, signal integrity, resistive losses and security is generally improved through elimination of parasitic losses (e.g., interconnects, capacitive and inductive coupling) typically present in systems with similar functionality but that use several individually packaged integrated circuits (IC's). Moreover, by placing all components on the same substrate platform, economy of scale is achieved that enables chip-scale cost reduction. Yet further, power management and consumption may be optimized potentially achieving long life battery operation, and facilitating packaging of various circuitry components on a single chip.

In operation, the integrated components of the detection device 22 may be configured to monitor the scene 24 in a sleep mode. When gross motion is detected, the detection device 22 transitions to a chopperless-active mode for detection and counting of at least one presence (e.g., a person) in the scene 24. The detection device 22 may further be configured to transition to a chopping mode for a much clearer image and the ability to identify the presence. When in the sleep mode, there is no detectable active movement in the field of view. More specifically and until movement is detected, the detection device 22 may operate with only a limited excitation current (e.g., nano amperage), with only a few of the plurality of sensors 52 being energized to detect gross motion. Once gross motion is detected, the processor 38 of the detection device 22 may be configured to transition the FPA 32 to the chopperless-active mode. Moreover, the processor 38 of the detection device 22 may automatically transition the FPA 32 back into the sleep mode in the event of non-movement or an unchanged occupancy or presence state. It is further contemplated and understood that the master unit 26 may be configured to command the processor 38 to transition between modes by sending command signals over the receiver 58 of the communication module 40. Such command signals may be sent wirelessly.

Figure 5:
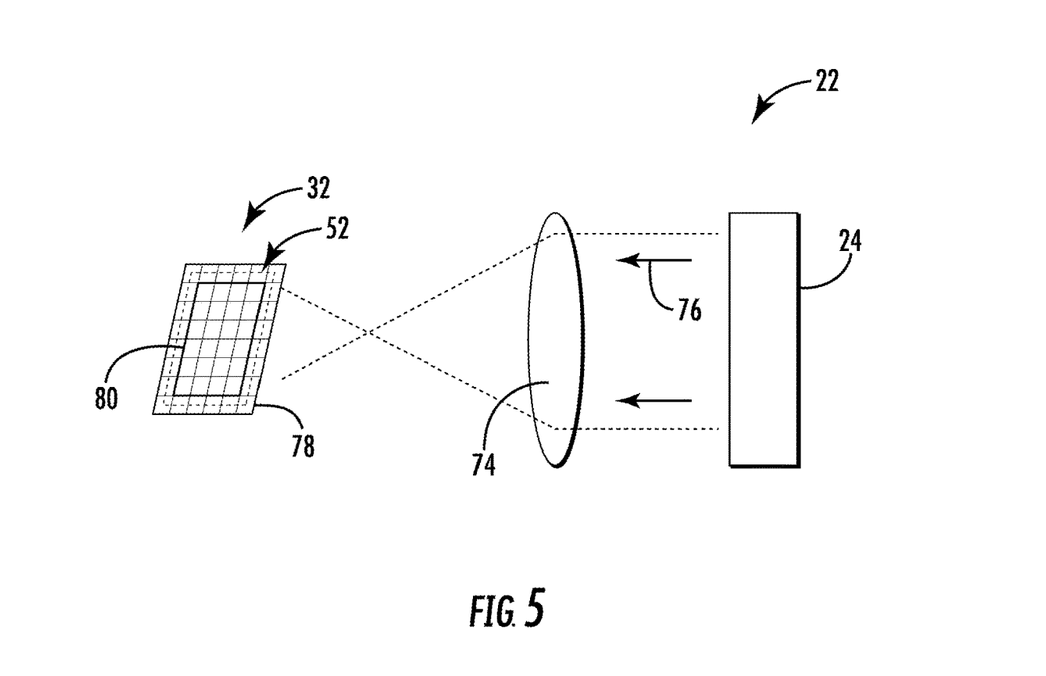
FIG. 5 is a schematic of the detection device illustrating radiant energy incident upon a focal plane array of the detection device.

Referring to FIG. 5, the detection device 22 may include a lens 74 generally located between the monitored scene 24 and the FPA 32 such that the FPA 32 is located on a focal plane (not shown) generally established by the optics of the lens 74. In operation, energy (see arrows 76) radiated by objects in the scene 24 are focused through the lens 74 and imparted upon the FPA 32 as incident radiation. To initially detect gross motion (i.e., movement of a presence) when in the sleep mode, a selected few or a first portion 78 of the plurality of image sensors 52 may be enabled (i.e., energized) to monitor the scene 24 while a remaining portion 80 of the image sensors 52 is disabled (i.e., de-energized). When a sensor 52 is enabled, the sensor may draw power from the power source 44, and when the sensor is disabled, the sensor draws minimal or no power. For purposes of conserving power (i.e., preserving battery life), the number of sensors of the first portion 78 may be substantially less than the number of sensors in the second portion 80.

In one embodiment, the first portion 78 of the sensors 52 may comprise sensors that are generally located about the periphery of the FPA 32. In such a configuration, the first portion 78 of sensors 52 may be configured to monitor a periphery of the scene 24 and the second portion 80 may be configured to detect a presence within the interior of the scene periphery. For example, if the scene 24 is a predefined space, when a person crosses the periphery of the scene 24, the first portion 78 of the sensors 52 will detect the presence and enable the second portion 80 to further interrogate the presence within the scene periphery. It is further contemplated and understood that the scene 24 may be the inside of a room. In such an example, the first portion 78 of sensors 52 may not monitor a complete periphery, and instead, may monitor area(s) adjacent to a door and/or window. In an alternate embodiment, the first portion 78 of the sensors 52 may be randomly scattered throughout FPA 32 or may be consolidated in one or more corners of FPA 32.

The pyroelectric presence identification system 20 may transition from the chopperless-active mode and into the chopping mode via a command signal from the processor 38 of the detection device 22, from master unit 26, from detected signals from a first portion 78 of the sensors 52, from other sources such as a discrete detector (not shown), and others. As is generally known in the art, the chopping mode may be facilitated by a mechanical chopper or other temperature reference. A mechanical or electrical chopper provides a thermal reference that sets the temperature of the FPA 32 components. When, a mechanical chopper 45 moves from the non-transmissive to the transmissive position, that reference temperature is changed due to radiation from the scene 24. In the absence of the chopper 45, there is no reference, and hence the SNR for variations in the scene 24 may not be as good. In a chopped mode of operation, with resulting improved image clarity, image recognition software generally known by those skilled in the art may be implemented to identify the presence. Such software may be loaded, for example, into processor 38 of the detection device 22, or a computer of the master unit 26.

Figure 6:
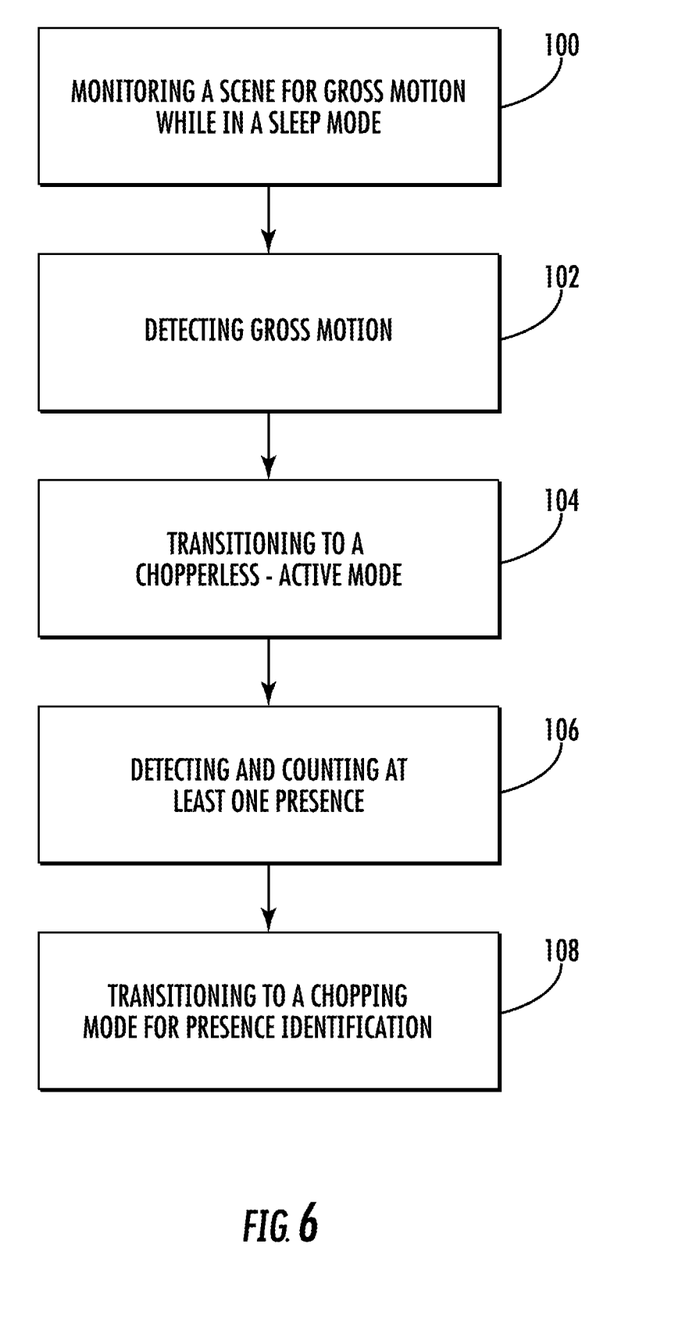
FIG. 6 is a flow chart of a method of operating the pyroelectric presence detection system.

Referring to FIG. 6 and in operation, the pyroelectric presence identification system 20 may include a first step 100 that monitors a scene 24 for gross motion while in a sleep mode. In step 102, gross motion may be detected by the detection device 22 while in the sleep mode. In step 104, the detection device 22 may transition to a chopperless-active mode, upon detection of gross motion, for detecting and counting of at least one presence. In step 106, the detection device 22 detects and counts at least one presence. In step 108, the detection device 22 may transition to a chopping mode for the identification of the at least one presence.

Benefits of the present disclosure include a detection device 22 having a sleep mode such that a majority of the device may remain in a low-power or un-powered mode while little is happening in the field of view (i.e. the scene 24), but is capable of resuming full power operation when appropriate. This ability to shift between sleep and active modes of operation conserves stored energy of the dedicated power source 44. In application where the power source is, for example, a battery, the detection device 22 may be generally wireless and may communicate wirelessly with outside systems such as a Building Management System 26.

Other benefits of the present disclosure include a pyroelectric presence identification system 20 that is suited for intrusion detection, and that may respond only to motion and therefor may inherently detect motion (e.g., from intrusion) as opposed to steady-state hot objects. Moreover, the system may offer only enough resolution and sensitivity to count persons, and therefore will not create invasion of privacy concerns unless specifically commanded. The detection device 22 may be built from the ferroelectric class of materials referred to as pyroelectrics. These materials have a volume polarization due to the nature of their crystal structure, which is non-centrosymetric. When operated significantly below their Curie point and previously poled, the net polarization varies approximately linearly with the temperature of the device. Thus, these materials can be metalized to form a capacitor structure. Upon temperature change of the device (i.e., either through deliberate heating or exposed to the radiant heat of a person, etc.), the polarization changes and charge, Q, is either deposited or removed from the metal surfaces comprising the electrodes of the capacitor; whereupon a voltage, V, appears across the capacitor, C, such that $V=Q/C$. This voltage is slowly bled off due to the small but finite internal conductivity of the pyroelectric material. Thus pyroelectric imagers respond best to transitory heating and cooling, and therefore respond when a person enters, moves within, or leaves an imaged scene. The ferroelectric detection device 22 may be built upon a thermal isolator rather than a MEMS bridge, thereby improving yield, reducing across device response variations, and may be compatible with wafer production having small feature sizes.

The detection device 22 may be tailored to match the energy budget and information content needs of a particular application. Moreover, benefits may include a detection device 22 capable of being connected to a network, and capable of transitioning between modes of operation upon command.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A pyroelectric presence identification system comprising:
   a focal plane array including a first image sensor and a plurality of second image sensors, with the first image sensor and the plurality of second image sensors configured to convert radiant energy into an electrical signal;
   a mechanical chopper disposed between a scene and the focal plane array; and
   a processor coupled to the focal plane array and configured to control the focal plane array in a sleep mode wherein the first image sensor is utilized to detect gross motion of at least one presence and the plurality of second image sensors are de-energized, wherein once gross motion is detected, the presence identification system is configured to operate in a chopperless-active mode wherein at least the plurality of second image sensors are energized for detection and counting of the at least one presence, and a chopping mode wherein at least the plurality of second image sensors are energized for identification of the at least one presence.

2. The pyroelectric presence identification system set forth in claim 1, wherein the first image sensor is configured to view a first portion of a scene and the plurality of second image sensors are configured to view a second portion of the scene.

3. The pyroelectric presence identification system set forth in claim 1, wherein the first image sensor and the plurality of second image sensors are infrared sensors.

4. The pyroelectric presence identification system set forth in claim 3, wherein the infrared sensors are passive infrared sensors.

5. The pyroelectric presence identification system set forth in claim 1 further comprising:
a battery for providing electrical power.

6. The pyroelectric presence identification system set forth in claim 1 further comprising:
a substrate platform with the focal plane array and the processor integrated onto the substrate platform.

7. The pyroelectric presence identification system set forth in claim 1 further comprising:
a wireless network configured to communicate with the processor to alter modes of operation.

8. The pyroelectric presence identification system set forth in claim 7 further comprising:
a battery for providing electrical power to at least the focal plane array.

9. The pyroelectric presence identification system set forth in claim 1, wherein the first image sensor is configured to view a first scene and the plurality of second image sensors are configured to view a second scene.

10. The pyroelectric presence identification system set forth in claim 1, wherein the first image sensor and the plurality of second image sensors are infrared sensors.

11. The pyroelectric presence identification system set forth in claim 10, wherein the infrared sensors are passive infrared sensors.

12. The pyroelectric presence identification system set forth in claim 1 further comprising:
a battery for providing electrical power.

13. The pyroelectric presence identification system set forth in claim 1 further comprising:
a substrate platform with the focal plane array and the processor integrated onto the substrate platform.

14. A method of operating a pyroelectric presence identification system comprising:
monitoring a scene for gross motion by a first image sensor of a focal plane array of a detection device operating in a sleep mode;
sensing the gross motion by the first image sensor of the detection device;
detecting at least one presence by a plurality of second image sensors of the detection device operating in a chopperless-active mode; and
identifying the at least one presence by the plurality of second image sensors of the detection device operating in a chopping mode.

15. The method set forth in claim 14, wherein the detection device when operating in the chopping mode is configured to identify the at least one presence.

16. The method set forth in claim 14, wherein at least one first image sensor of the focal plane array is utilized and the plurality of second image sensors of the focal plane array are de-energized when operating in the sleep mode.

17. The method set forth in claim 16, wherein the plurality of second image sensors are energized when operating in the chopperless-active mode.

18. The method set forth in claim 17, wherein the plurality of second image sensors are energized when operating in the chopping mode.

* * * * *